United States Patent [19]

Brown et al.

[11] Patent Number: 4,984,268
[45] Date of Patent: Jan. 8, 1991

[54] TELEPHONE HANDSET CONSTRUCTION

[75] Inventors: Reed S. Brown; Alex M. Brzezinski, both of Indianapolis, Ind.; Tinyee Jue, Shreveport; William L. Woods, Jr., Keithville, both of La.; Robert S. Zieles, Indianapolis, Ind.

[73] Assignee: AT&T Bell Laboratories, Murray Hill, N.J.

[21] Appl. No.: 274,219

[22] Filed: Nov. 21, 1988

[51] Int. Cl.$^5$ .............................................. H04M 1/04
[52] U.S. Cl. ..................................... 379/433; 381/188; 381/205
[58] Field of Search ................ 379/433; 381/153, 158, 381/159, 188, 205; 181/242

[56] References Cited

U.S. PATENT DOCUMENTS

| | | | |
|---|---|---|---|
| 4,124,785 | 11/1978 | Seretny et al. | 379/429 |
| 4,163,875 | 8/1979 | Cogan | 379/433 |
| 4,319,095 | 3/1982 | Cogan | 379/433 |
| 4,672,666 | 6/1987 | Kuhfus | 379/433 |
| 4,712,236 | 12/1987 | Brown et al. | 379/433 |
| 4,773,091 | 2/1988 | Busche et al. | 379/433 |
| 4,776,009 | 10/1988 | Gumb et al. | 379/433 |

FOREIGN PATENT DOCUMENTS

| | | | |
|---|---|---|---|
| 2061692 | 6/1972 | Fed. Rep. of Germany | 379/433 |
| 2254410 | 5/1974 | Fed. Rep. of Germany | 379/433 |
| 2358602 | 6/1975 | Fed. Rep. of Germany | 379/433 |
| 3107308 | 9/1982 | Fed. Rep. of Germany | 381/153 |
| 3402639 | 8/1985 | Fed. Rep. of Germany | 379/433 |
| 3524012 | 1/1987 | Fed. Rep. of Germany | 379/433 |
| 659749 | 1/1987 | Switzerland | 379/433 |
| 974487 | 11/1984 | United Kingdom | 379/433 |
| 2199213 | 6/1988 | United Kingdom | 379/433 |

OTHER PUBLICATIONS

WO86/02508 "Device for the Retention, Acoustic Sealing and Vibration Isolation of an Electro Acoustic Converter" Apr. 24, 1986.

Primary Examiner—Jin F. Ng
Assistant Examiner—M. Nelson McGeary, III
Attorney, Agent, or Firm—Michael A. Morra

[57] ABSTRACT

A telephone handset comprises elongated complementary upper and lower housing members that mate at their perimeters to form a hollow handset housing. The lower housing member includes a pair of spaced apart transducer receiving cavities, each being shaped to receive a cylindrical transducer surrounded by a flexible tubular gasket and form an acoustic seal therewith. Each gasket includes flanges around its circumference that project radially outward and in a direction opposite to the direction of insertion of the transducer/gasket assembly into its associated cavity. Such construction provides adequate mechanical retention between the transducer and the lower housing member and avoids the need for additional retaining hardware. The upper housing is joined to the lower housing using one or more pairs of side-mounted, interlocking hooks and latches. The upper housing further includes ribs, molded therein and positioned to maintain the transducers in place when it is joined with the lower housing.

17 Claims, 4 Drawing Sheets

TELEPHONE HANDSET CONSTRUCTION

TECHNICAL FIELD

This invention relates to telephone handsets, and within that field to a telephone handset construction that facilitates the assembly of handset components.

BACKGROUND OF THE INVENTION

Telephone handsets typically comprise complementary upper and lower housing members that mate at their perimeters to form a hollow handset housing. The handset contains microphone and loudspeaker transducers for respectively transmitting and receiving audible signals. Over the years, technology has improved telephone handset construction making them less expensive, more rugged, easier to assemble, and providing higher sound quality than earlier models.

In many telephone handsets, relatively complex and labor intensive schemes exist for affixing the transducers to the lower housing member (deck). Most schemes require the use of a special plate or cup-shaped retainer that is fastened to the deck with several screws—typically two or more. Examples of such design are shown in U.S. Pat. Nos. 4,124,785 and 4,319,095.

Holding the deck and shell members together frequently requires the use of bonding materials or epoxy adhesives that need a 24-hour curing period. Such an interval is inconsistent with modern manufacturing techniques such as Just-In-Time (JIT) fabrication that reduces factory inventory and, hence, lowers cost. An example of a telephone handset that uses bonding materials in its construction is shown in U.S. Pat. No. 4,712,236. Alternatively, interlocking hook and latch members at the extremes of the handset are frequently used to hold those members together. Such interlocking, however, does not provide good mechanical joining of the deck and shell which readily separate from each other when the handset is dropped.

The control of acoustic leakage between transmitter and receiver transducers is important in regulating background noise. Frequently, flexible gaskets are used to provide acoustic seals and rely on auxiliary mechanical means to maintain pressure on the gasket. Generally, only the front surface of the transducer is sealed and uniform mechanical pressure around the transducer is needed to eliminate acoustic leakage. An example of such a technique is shown in U.S. Pat. No. 4,163,875 where the gasket used to seal the front surface of the transmitter also serves to hold the transmitter and cup-shaped member together. In that patent, however, the acoustic seal at the transmitter is maintained by mechanical forces transferred to the shell. In turn, the shell transfers these forces to interlocking hooks and latches that are positioned at the extremes of handset. The mechanical seal at the receiver is maintained by a cup which covers the receiver and has a rim that is rotated into engagement with projections molded in the deck. The cup not only represents an additional part, but internal projections complicate the molding process while rotational engagement complicates the assembly process.

Accordingly, it is an object of the present invention to provide a telephone handset construction that facilitates assembly at reduced cost.

It is another object of the invention to provide good acoustic seals for the transmitter and receiver without reliance on mechanical fastening apparatus.

It is yet another object of the present invention to provide a design which does not require the use of bonding materials and yet is rugged enough to withstand repeated drops without separating.

SUMMARY OF THE INVENTION

A telephone handset comprises elongated complementary upper and lower housing members that mate at their perimeter to form a hollow housing. The lower housing member includes at least a first cavity. The cavity is fully opened at one end and has a pattern of smaller openings at the other for passing audible sounds. A transducer and a flexible tubular gasket form an assembly that is inserted into the cavity. The gasket includes flanges around its circumference that extend outwardly and in a direction opposite to the direction of insertion into the cavity. The diameter of the cavity is selected to closely fit, and provide good mechanical retention with, the assembly inserted therein. The flanges allow easy insertion of the assembly into the cavity while simultaneously making the removal of same more difficult.

In preferred embodiments, the lower housing member includes a pair of spaced-apart cavities of the type described above and the cavities are of cylindrical shape. The transducer inserted with its gasket into one of the cavities is a cylindrical microphone and the transducer inserted with its gasket into the other one of the cavities is a cylindrical loudspeaker.

Also in preferred embodiments, the upper and lower housings are joined together using side-mounted, mating hooks and latches adjacent to at least one of the cavities. This configuration offers superior joining power over earlier models equipped with end-mounted hooks and latches, particularly when the handset is dropped. The upper housing includes ribs for pressing against each of the transducer assemblies in order to provide additional mechanical support when the upper and lower housings are joined together.

It is a feature of the present invention that the flexible gasket used with the receiver transducer is shaped to provide an additional acoustic seal around the front surface of the receiver.

It is another feature of the invention that the upper housing is shaped to augment retention of each transducer within its cavity.

These and other objects and features of the present invention will be more fully understood when reference is made to the associated drawing and detailed description.

DETAILED DESCRIPTION

Figure 1:
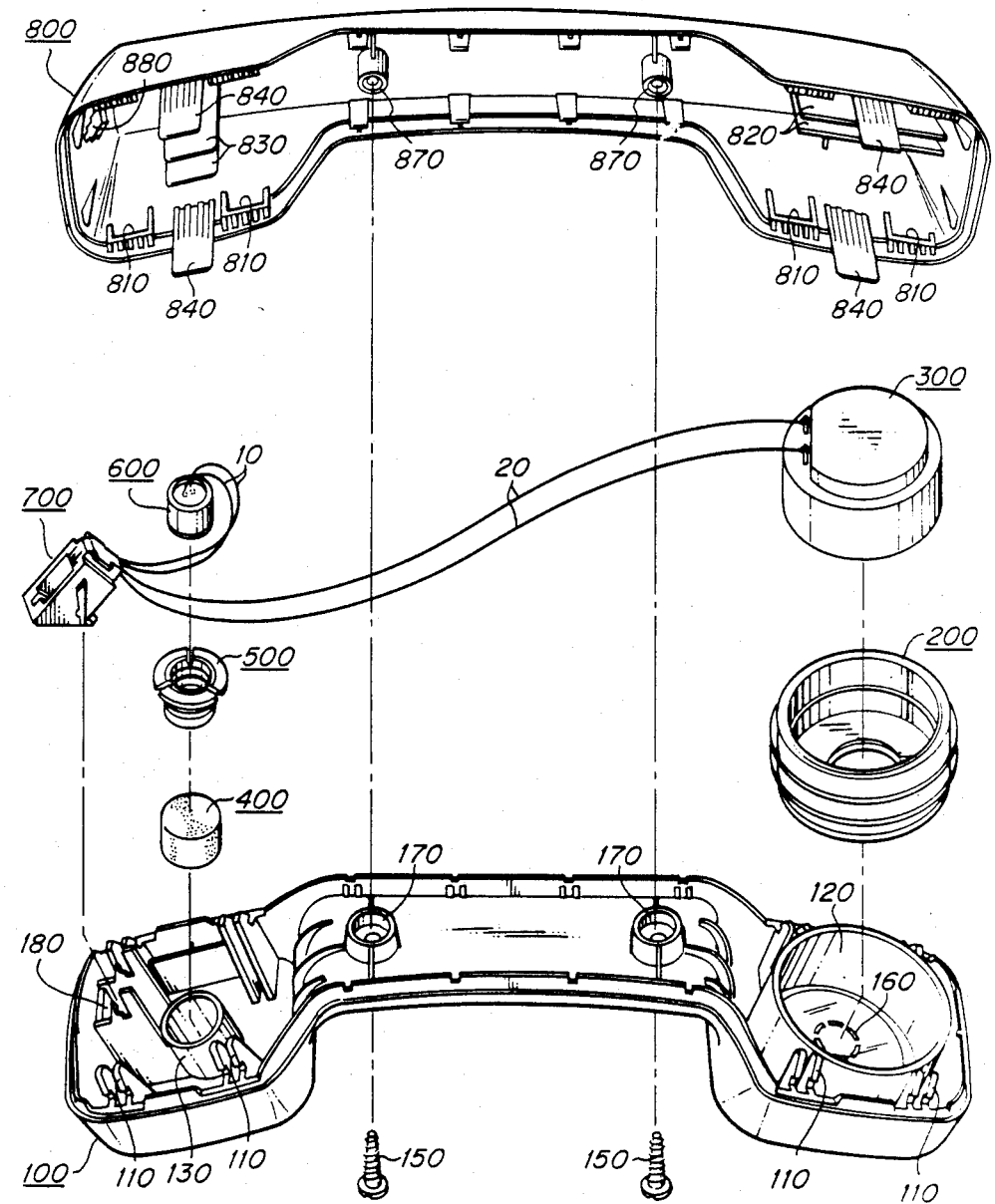
FIG. 1 is an exploded perspective view of a telephone handset in accordance with the invention, the upper housing member being rotated to more clearly show its interior structure.

FIG. 1 shows an exploded view of the present invention that illustrates, in detail, the construction of the telephone handset in accordance with the invention and its ease of assembly. Lower housing member 100, also known as the deck, is a molded part that holds the operational components of the handset. Holes 160, located in the receiver end of the deck, provide a path for the received audible signals to pass from an inserted receiver 300 to a user's ear. Receiver 300 is a conventional loudspeaker having a generally cylindrical shape, such as the PRIMO DH-60ES. Its dimensions are approximately 0.71 inches high and 1.38 inches in diameter and contains a loudspeaker within a metal can that is sealed at its backside and contains a plurality of holes at its front side. Receiver 300 is inserted into gasket 200 whose characteristics will be described later. The gasket fits tightly around the receiver and together they form a receiver assembly 200, 300 that fits into cylinder 120 which is molded into the deck 100. Receiver assembly 200, 300 fits snugly into the cylinder 120 where it is frictionally held in place. Furthermore, a secondary acoustic seal is created between the gasket 200 and the inside wall of cylinder 120 in order to reduce the level of audible sounds delivered to the user's ear from sources other than receiver 300.

Holes are located in the transmitter end of the deck to provide a path for transmitted audible signals to pass from the user's mouth to a transmitter 600. Transmitter 600 is a conventional microphone having a generally cylindrical shape such as the PRIMO EM80 PB7. Its dimensions are approximately 0.28 inches high and 0.39 inches in diameter and contains an electret transmitter within a metal can that is sealed at its back side and contains a single hole in its front side. Transmitter 600 is inserted into gasket 500 whose characteristics are similar to gasket 200 and will also be described later. The gasket fits tightly around the transmitter and together forms a transmitter assembly 500, 600 that fits into cylinder 130 that is molded into the deck 100. Transmitter assembly 500, 600 fits snugly into the cylinder 130 and is acoustically sealed from audible sounds that might pass through holes at the base of cylinder 130 into the hollow cavity of the handset formed when the upper housing and the lower housing are joined together. Acoustic damping foam 400 comprises a small cylindrical sponge that is placed between the holes at the base of cylinder 130 and the transmitter assembly 500, 600 to attenuate high frequency speech components and to minimize air turbulence in the vicinity of the handset's transmitter ports; such turbulence being created when a user generates a puff of air during normal speech.

To facilitate the assembly process, receiver 300, transmitter 600 and modular jack 700 are pre-wired prior to assembly. Wire pair 10 joins transmitter 600 to modular jack 700, and wire pair 20 joins receiver 300 with modular jack 700. During assembly, jack 700 is fitted into jack support member 180 where it is held captured by the cooperation of small protrusions in the jack and mating indentations molded into the support member 180. As stated previously, flexible gaskets 200, 500 are fitted around transducers 300, 600 and then pressed into cylinders 120, 130 respectively.

Upper housing member 800, also known as the shell, is now ready to be mated with the deck 100 along their perimeters. The particularly rugged interconnection of these members eliminates any need for adhesive materials such as epoxy. This advantageously eliminates curing time, potential delays in manufacturing, and consequent build up of inventory used to circumvent such delays. It is noted that the deck 100 and shell 800 do not necessarily have identical contours prior to assembly due to manufacturing variations. Nevertheless, it is important that the contours be identical after assembly so that the parting line between them be uniform for appearance reasons. This is accomplished by anchoring the deck and shell at each end and at the center. Side-locking hooks 110 on deck 100 join with side-locking latches 810 on shell 800 in both the transmitter and receiver regions. Screws 150 enter deck 100 through holes 170 and are fitted into bosses 870 molded into shell 800. The deck and shell are now firmly supported in three regions to offer a rugged handset with excellent appearance.

Positioning the interlocking hooks and latches on the side of the handset rather than at its ends represents an improvement over prior designs. Previously, when the handset was dropped, the impact frequently caused end-mounted hooks and latches to disconnect and the customer was then required to snap the handset back together again. This was both an inconvenience and an indication to the customer that quality was lacking in the construction of the handset. Interlocking hooks and latches, mounted on the sides of the deck and shell in the vicinity of the transducers, are not subject to the extreme forces encountered at the far ends of the handset. In some embodiments, interlocking hooks and latches are only needed at one end of the handset because the deck and shell utilize, for example, a rotational interlocking connection at the other end thereof. Such rotational interlocking is generally impervious to uncoupling when the handset is dropped, but can only be used at one end. Naturally, hooks and latches that snap together are required at the other end and are advantageously positioned on opposite sides of at least one of the cavities in the present invention.

Ribs 820 and 830 molded into shell 800 cooperate with receiver 300 and transmitter 600 respectively to hold them in place when the handset is dropped or otherwise impacted. Ribs 820 and 830 therefore assist the gaskets 200, 500 in holding the transducers within their mating cylinders when the deck 100 and shell 800 are joined. Shell 800 also includes an opening 880 to accommodate the insertion of a conventional modular plug (not shown) into modular jack 700 which is accessed through opening 880.

Figure 2:
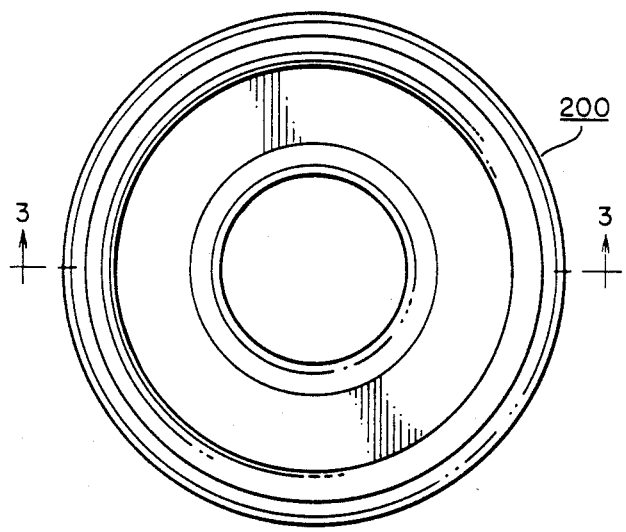
FIG. 2 is a top view of a receiver gasket used in the invention.
Figure 3:
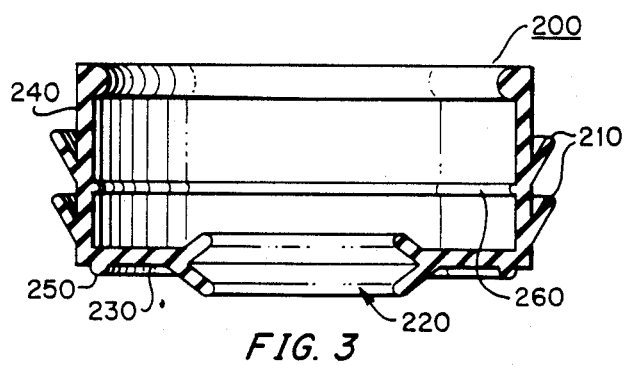
FIG. 3 is a cross-sectional view of the receiver gasket shown in FIG. 2.

FIG. 2 provides a top view of the receiver gasket 200 while FIG. 3 provides a cross-section thereof. Flanges 210 extend around the circumference of gasket 200, and project radially outward and upward from side wall 240 of the gasket. The flanges 210 are positioned to facilitate insertion of the gasket into the cylinder 120 but to impede its removal therefrom. This not only provides superior retention properties of the transducer/gasket assembly into the cylinder but also provides a secondary acoustic seal between gasket 200 and cylinder 120. The front face 230 of gasket 200 includes a circular opening, whose edge comprises a V-shaped groove 220, that permits the free movement of sound waves. Front face 230 is adapted to form a seal between the front surface of receiver 300 and the base of cylinder 120. V-shaped groove 220 is flexible and is easily compressed when the transducer assembly 200, 300 is inserted into cylinder 120. Accordingly, a primary acoustic seal is formed between gasket 200 and cylinder 120. V-shaped groove 220 is maintained in a compressed state when the deck 100 and shell 800 are joined together. Front face 230 of gasket 200 also includes an annular ring 250 that presses against a similarly shaped circular member 125 (shown in FIG. 6–8) molded into the bottom of cylinder 120. Annular ring 250 and circular member 125 cooperate to limit travel during insertion of the gasket into the cylinder.

Around the inside wall of gasket 200 is circumferential rib 260 that improves the seal between gasket 200 and receiver 300. Rib 260 facilitates the insertion of receiver 300 into gasket 200, and comprises a 0.01 inch protrusion on the inside wall of gasket 200. It is noted that in the present invention, complexity of gasket design "buys" the designer freedom from cups and screws and glue—previously used to fasten the receiver to the deck and seal it from outside noise.

Gasket 200 has an approximate wall thickness of 0.05 inches and an inner diameter of 1.36 inches, which is slightly smaller than the outer diameter of receiver 300. Accordingly, a reasonably tight fit between receiver and gasket is assured. The inner diameter of the cylinder 120 is slightly smaller than the outer diameter of the gasket when its flanges are included; but slightly larger than the outer diameter of the gasket when its flanges are excluded. Accordingly, a snug fit is assured between cylinder 120 and gasket 200. The importance of a snug fit is underscored because, as shown, in FIG. 1, cylinders 120 and 130 comprise smooth vertical walls such that throughout each cavity a uniform diameter is maintained.

Gasket 200 is molded from a flexible rubber material such as Ethylene-Propylene-Diene-Monomer (EPDM)—a synthetic rubber. Preferably, the hardness rating of the gasket material resides in the range between 40–80 durometer, Shore A. A lower hardness rating increases the frictional bond between the gasket and cylinder, whereas a higher hardness rating facilitates the assembly of gasket and transducer. In the present invention, a hardness of 60 durometer is used. Carbon particles are occasionally used in coloring EPDM materials for aesthetic purposes; however, in the present application, it is important that carbon particles be excluded from the EPDM material in order to protect the transducer from damage due to electrostatic discharge. Such discharge might occur, for example, when a user of the telephone handset places her ear near the receiver.

Figure 4:
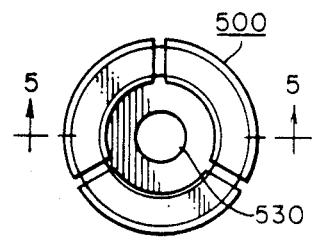
FIG. 4 is a top view of a microphone gasket used in the invention.
Figure 5:
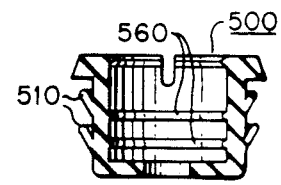
FIG. 5 is a cross-sectional view of the transmitter gasket shown in FIG. 4.

FIG. 4 and FIG. 5 provide top and cross-section views respectively of the gasket 500 used in conjunction with transmitter 600. It too is equipped with a pair of flanges 510 around its circumference that, like gasket 200, are positioned in a direction opposite to the direction of insertion of the gasket into its associated cylinder which assists insertion while hampering removal. Similar to gasket 200, gasket 500 is also equipped with circumferential ribs 560 that improve its seal with transmitter 600. Ribs 560 facilitate the insertion of transmitter 600 into gasket 500, and comprise a 0.01 inch protrusion on the inside wall of gasket 500. Unlike gasket 200, however, the front portion of gasket 500 is not compressed against the inside of associated cylinder 130 due to the presence of acoustic damping foam 400.

Figure 6:
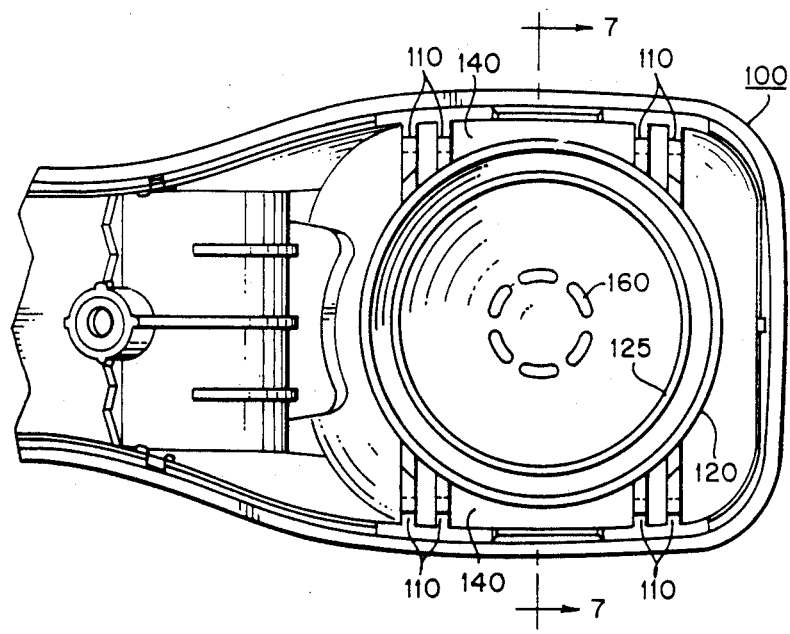
FIG. 6 is a top view of the lower housing member in the region of the receiver.

Referring now to FIG. 6, a top view of the deck 100 in the region of the receiver is shown. Cylinder 120 is molded into the deck 100 and receives additional support from hooks 110 which also serve as support ribs for the cylinder 120. In the event that the use of bonding materials is desirable, an alternative way to join deck and shell members is possible. A slurry, such as Acrylonitrile-Butadiene-Styrene (ABS) mixed with a solvent, is poured into recesses 140. These recesses are bounded by the outside of cylinder 120, hooks 110 and an inside wall of the deck 100. Generally similar recesses (shown in FIG. 1) perform the same function in the region of the transmitter. To enhance bonding, an ABS slurry is used when the deck and shell are made from ABS material. Thereafter, shell 800 is joined with deck 100, and tongue members 840 (shown in FIG. 1) extend into the recesses 140. Screws 150 hold the deck and shell together while the ABS slurry cures. This technique is discussed in U.S. Pat. No. 4,712,236 issued to Brown et al on Dec. 8, 1987. It is obviously desirable to eliminate hooks 110 because they require what is known as a "cam pull" rather than a "straight pull" which increases the complexity of the molding process. Nevertheless, as long as hooks and latches are used, positioning them on the sides of the deck and shell rather than at the ends thereof is advantageous from the standpoint of durability under impact.

Figure 7:
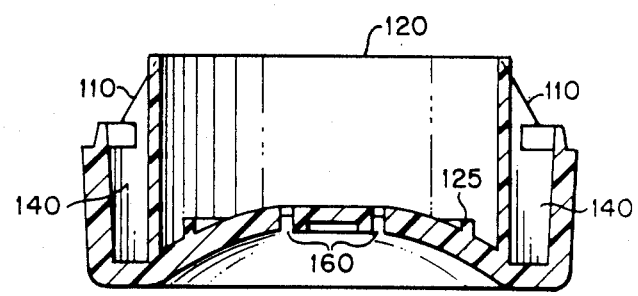
FIG. 7 is a cross-sectional view of the lower housing member shown in FIG. 6.

FIG. 7 provides a cross-section view of the deck in the region of the receiver illustrating the shape of hooks 110.

Figure 8:
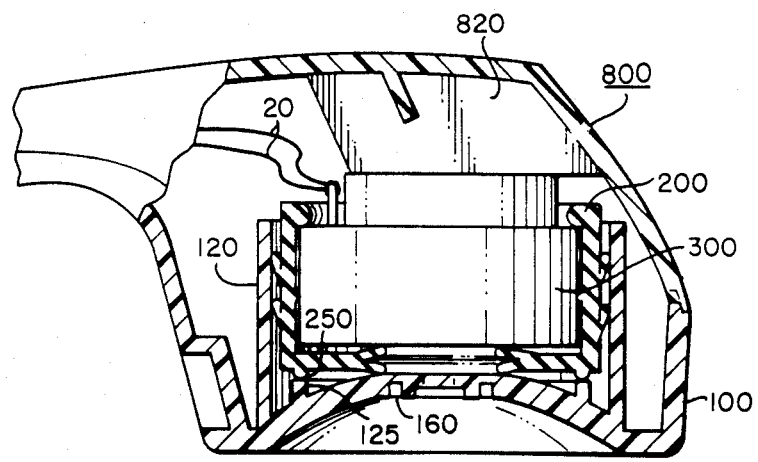
FIG. 8 is a cross-sectional view of the assembled telephone handset in the region of the receiver.

FIG. 8 is a cross-section view of the fully assembled handset in the region of the receiver. Although the receiver/gasket assembly 200, 300 is retained within cylinder 120 by friction between the gasket and the cylinder, an additional slight retaining force is provided by ribs 820 when the deck 100 and shell 800 are joined together. The ribs provide a mechanical boundary that sets the minimum compression on that portion of the gasket 200 which partially covers the front surface of receiver 300. The retaining force provided by ribs 820 is transferred to latches 810 molded into shell 800 which engage hooks 110 in the deck 100.

Although a particular embodiment has been disclosed, it is understood that various modifications are possible within the spirit and scope of the invention. Such modifications include, but are not limited to, the use of variously shaped flexible gaskets and transducers; and other mechanical or chemical bonding techniques to join the deck and shell.

We claim:
1. A telephone handset comprising:
   a lower housing member having a first cylindrically-shaped cavity of uniform diameter throughout, open at one end for receiving a transducer and having a pattern of holes at the other end to enable the passage of audible sounds, said cavity including smooth, vertical walls;
   a receiver transducer, cylindrically-shaped and adapted to convert electrical signals into audible sounds, the receiver transducer including at least one hole in a front surface thereof to enable the passage of said audible sounds;
   a first flexible tubular gasket surrounding the receiver transducer around its circumference, the combined first tubular gasket and receiver transducer having an outer diameter sized to: (i) fit into the first cylin- drically-shaped cavity of the lower housing member, (ii) be frictionally held therein, (iii) form a seal between the receiver and said first cavity; and an upper housing member adapted to mate with the lower housing member to form a handset housing.

2. The telephone handset of claim 1 wherein the first flexible tubular gasket includes at least one flange positioned around its outside circumference that project radially outward and in a direction opposite to the direction of insertion of said gasket into the first cavity, whereby said flanges operate to assist insertion of the gasket into the first cavity while impeding removal therefrom.

3. The telephone handset of claim 1 wherein the first flexible tubular gasket includes at least one rib positioned around its inside circumference that project radially inward, whereby said ribs operate to assist insertion of the receiver transducer into the gasket and improve the seal therebetween.

4. The telephone handset of claim 2 wherein the first flexible tubular gasket is shaped to cover a portion of the front surface of the receiver transducer, the gasket including a circular opening in the region of the front surface to expose the holes in the receiver transducer and further including a flexible V-shaped groove around the circular opening to provide a seal between the receiver and said first cavity.

5. The telephone handset of claim 4 wherein the gasket is formed from an Ethylene-Propylene-Diene-Monomer material having a hardness in the range of 40–80 durometer, Shore A; whereby its flexibility provides good mechanical retention and a good acoustic seal with the cylindrically-shaped cavity.

6. The telephone handset of claim 1 wherein the upper housing member includes at least one rib adapted to press against the receiver transducer when the upper and lower housing members are joined together, whereby an additional holding force is applied to the receiver to hold it securely within its cavity.

7. The telephone handset of claim 1 wherein the upper and lower housing members include interlocking hooks and latches positioned on opposite sides of the first cylindrically-shaped cavity for holding said upper and lower housing members together.

8. The telephone handset of claim 1 further comprising:

a second cylindrically-shaped cavity in the lower housing member, open at one end for receiving a transducer;

a transmitter transducer, cylindrically-shaped and adapted to convert audible sounds into electrical signals; and a second flexible tubular gasket surrounding the transmitter transducer around its circumference and a portion of its front surface, the combined second tubular gasket and transmitter transducer having an outer diameter sized to: (i) fit into the second cylindrically-shaped cavity of the lower housing member, (ii) be frictionally held therein, and (iii) form a seal between the transmitter transducer and the second cavity.

9. The telephone handset of claim 8 wherein the second flexible tubular gasket includes at least one rib positioned around its inside circumference that project radially inward, whereby said ribs operate to assist insertion of the transmitter transducer into the gasket and improve the seal therebetween.

10. The telephone handset of claim 8 further including acoustic damping foam, positioned between the pattern of holes within the second cylindrically-shaped cavity and the transmitter transducer inserted therein.

11. The telephone handset of claim 8 wherein the upper and lower housing members include interlocking hooks and latches positioned on opposite sides of the second cylindrically-shaped cavity for holding said upper and lower housing members together.

12. A telephone handset comprising elongated complementary upper and lower housing members that mate at their perimeters to form a hollow handset housing, the handset housing containing a transmitter for converting audible sounds into electrical signals, a receiver for converting electrical signals into audible sounds, and means for interconnecting electrical signals between the telephone handset and associated telephone equipment

CHARACTERIZED BY:

a pair of spaced-apart cylindrically-shaped cavities, the cavities having smooth vertical walls such that throughout each cavity a uniform diameter is maintained and said cavities being molded into the lower housing member, for receiving the transmitter and receiver;

a first flexible tubular gasket adapted to cover the receiver around its outside circumference and a portion of a front surface thereof; and a second flexible tubular gasket adapted to cover the transmitter around its outside circumference, said first and second flexible tubular gaskets frictionally cooperating with the cavities to hold the receiver and transmitter in place.

13. The telephone handset of claim 12 wherein the complementary upper and lower housing members include interlocking hooks and latches positioned on opposite sides of at least one of the cylindrically-shaped cavities for holding said upper and lower housing members together.

14. In a telephone handset a lower housing, molded from a plastic material and shaped at each end to include first and second circular recesses having perforated bases and side walls of uniform diameter throughout extending smoothly upward from each base, the first circular recess containing a receiver assembly and the second circular recess containing a transmitter assembly the transmitter assembly comprising:

a microphone having a front face positioned towards the base of the second circular recess and a second resilient tubular gasket surrounding the outside of the microphone and a portion of its front face for frictionally holding the microphone within the second circular recess, said second gasket including at least one outwardly projecting flange that extends in a continuous path around the outside of the second gasket and is oriented in a direction away from the front face of the microphone to thereby allow relatively easy entrance of the microphone into the second circular recess but relatively difficult removal therefrom the receiver assembly comprising:

a loudspeaker having a front face positioned towards the base of the first circular recess and a first resilient tubular gasket surrounding the outside of the loudspeaker and a portion of its front face for frictionally holding the receiver within the first circular recess, said first gasket including at least one outwardly projecting flange that extends in a continuous path around the outside of the first gasket and is oriented in a direction away from the front face of the loudspeaker to thereby allow relatively easy entrance of the loudspeaker into the first circular recess but relatively difficult removal therefrom.

15. The telephone handset of claim 14 wherein the first and second flexible tubular gaskets each include at least one rib positioned around its inside circumference that project radially inward; whereby said ribs operate to assist insertion of the loudspeaker and microphone into the first and second gaskets respectively, and improve the seals therebetween.

16. In the telephone handset of claim 14 further including an upper housing, adapted to join with the lower housing and be held together therewith by interlocking hooks and latches positioned on opposite sides of each of the first and second circular recesses.

17. In the telephone handset of claim 16 further including support members molded into the upper housing for supporting the receiver and transmitter assemblies in their respective first and second circular recesses after the upper and lower housings are joined.

* * * * *